(12) United States Patent
Kondo et al.

(10) Patent No.: US 8,011,392 B2
(45) Date of Patent: Sep. 6, 2011

(54) PIPING HAVING FLUID-MIXING REGION

(75) Inventors: Yoshiyuki Kondo, Hyogo-ken (JP);
Koichi Tanimoto, Hyogo-ken (JP);
Shigeki Suzuki, Hyogo (JP); Yoshikazu Nitta, Hyogo (JP); Toshikatsu Hasunuma, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 538 days.

(21) Appl. No.: 11/989,526

(22) PCT Filed: Sep. 28, 2006

(86) PCT No.: PCT/JP2006/319302
§ 371 (c)(1),
(2), (4) Date: Sep. 25, 2008

(87) PCT Pub. No.: WO2007/037328
PCT Pub. Date: Apr. 5, 2007

(65) Prior Publication Data
US 2009/0090424 A1    Apr. 9, 2009

(30) Foreign Application Priority Data

Sep. 29, 2005 (JP) .................................. 2005-283694
Sep. 26, 2006 (JP) .................................. 2006-260367

(51) Int. Cl.
*F16L 11/00* (2006.01)
(52) U.S. Cl. ........ 138/114; 138/103; 138/177; 138/108; 366/178.1; 366/178.3; 239/432
(58) Field of Classification Search ............... 138/114, 138/103, 177, 178; 366/107, 178.1, 178.3; 239/432
See application file for complete search history.

(56) References Cited

U.S. PATENT DOCUMENTS 2,784,948 A * 3/1957 Pahl et al. .................. 366/174.1
(Continued)

FOREIGN PATENT DOCUMENTS

EP    0864633 A2    9/1998
(Continued)

OTHER PUBLICATIONS

International Search Report of PCT/JP2006/319302, date of mailing Dec. 19, 2006.

(Continued)

*Primary Examiner* — Patrick F Brinson
(74) *Attorney, Agent, or Firm* — Westerman, Hattori, Daniels & Adrian, LLP

(57) ABSTRACT

An object is to prevent thermal fatigue, resulting from variations in temperature interfaces, of piping having a fluid-mixing region where fluids of different temperatures are mixed. Piping 1 having a fluid-mixing region M includes a reducer 5 including an end portion 5e disposed substantially on a central axis of a main pipe 2. Low-temperature water flows through the reducer 5 at a lower velocity than high-temperature water flowing outside the end portion 5e. The low-temperature water and the high-temperature water have different temperatures. The low-temperature water and the high-temperature water are mixed in the fluid-mixing region M downstream of the reducer 5. The reducer 5 has a weld line 5f formed to connect the end portion 5e and an elbow portion 5d together. The distance between the weld line 5f and a downstream end 5a is equal to or larger than the inner diameter D of the main pipe 2.

12 Claims, 12 Drawing Sheets

U.S. PATENT DOCUMENTS

| | | | | |
|---|---|---|---|---|
| 3,818,938 | A | * 6/1974 | Carson | 366/167.1 |
| 3,847,375 | A | * 11/1974 | Kuerten et al. | 366/101 |
| 4,633,909 | A | 1/1987 | Louboutin et al. | 137/888 |
| 5,289,976 | A | * 3/1994 | Dou et al. | 239/431 |
| 5,948,241 | A | * 9/1999 | Owen | 208/113 |
| 6,186,658 | B1 | 2/2001 | Nishida et al. | |

FOREIGN PATENT DOCUMENTS

| | | | |
|---|---|---|---|
| JP | 59-217091 | A | 12/1984 |
| JP | 60-227820 | A | 11/1985 |
| JP | 61-99794 | A | 5/1986 |
| JP | 62-63294 | A | 3/1987 |
| JP | 62-75194 | A | 4/1987 |
| JP | 64-026005 | A | 1/1989 |
| JP | 1077189 | U | 5/1989 |
| JP | 3-52700 | U | 5/1991 |
| JP | 7-181282 | A | 7/1995 |
| JP | 7-243595 | A | 9/1995 |
| JP | 08-109386 | A | 4/1996 |
| JP | 9-14536 | A | 1/1997 |
| JP | 10-180067 | A | 7/1998 |
| JP | 10-249178 | A | 9/1998 |
| JP | 2002-320836 | A | 11/2002 |
| JP | 2005-16686 | A | 1/2005 |
| KR | 1981-590 | | 5/1981 |
| TW | 387536 | | 4/2000 |
| TW | 591187 | | 6/2004 |

OTHER PUBLICATIONS

Taiwanese Search Report of Taiwanese Patent Application No. 094146721, dated Feb. 4, 2008 and English translation.
Korean Office Action dated Jun. 23, 2009, issued in corresponding Korean Patent Application No. 10-2008-7001963.
Canadian Office Action dated Jul. 19, 2010, received Jul. 21, 2010 regarding Canadian Application No. 2,617,340.
International Search Report mailed on Mar. 28, 2006, issued in corresponding International application No. PCT/JP2005/022848.
Japanese Office Action dated May 31, 2011, issued in corresponding Japanese Patent Application No. 2006-260367.

* cited by examiner

PIPING HAVING FLUID-MIXING REGION

TECHNICAL FIELD

The present invention relates to piping that has a fluid-mixing region where fluids of different temperatures are mixed and that is suitable for use in, for example, nuclear power plants.

BACKGROUND ART

Much piping through which high-temperature water and low-temperature water flow is provided in plants such as nuclear power plants and thermal power plants. Such piping includes a branch pipe perpendicularly connected to a main pipe and has a fluid-mixing region where low-temperature water flowing through the branch pipe joins high-temperature water flowing through the main pipe (of course, a configuration in which low-temperature water flows through the main pipe and high-temperature water flows through the branch pipe is also possible). In the fluid-mixing region, a temperature interface is formed between the high-temperature water and the low-temperature water. This temperature interface varies in position (temperature fluctuation), thus causing the problem that the metal constituting the piping experiences thermal fatigue. To avoid the thermal fatigue, the high-temperature water and the low-temperature water must be quickly mixed.

Patent Document 1 discloses a technique for facilitating the mixing of high-temperature water flowing through a main pipe and low-temperature water flowing out of a reducer through a branch pipe by fixing an upstream end of the reducer to an inner circumferential wall of the branch pipe and positioning a downstream end of the reducer, having a reduced inner diameter, on the central axis of the main pipe.

Also disclosed is a technique for further facilitating the mixing of the fluids by providing guide vanes on the reducer disposed inside the main pipe to apply a swirling force to the fluid flowing through the main pipe.

Patent Document 1: Japanese Unexamined Patent Application, Publication No. 2005-16686 (FIGS. 10, 13, and 14)

DISCLOSURE OF INVENTION

Although the technique described in Patent Document 1 facilitates the mixing of fluids, it is difficult to completely prevent variations in temperature interfaces occurring at various sites of the piping. A measure has therefore been demanded to further reduce thermal fatigue resulting from variations in temperature interfaces.

An object of the present invention, which has been made in light of the above circumstances, is to prevent thermal fatigue, resulting from variations in temperature interfaces, of piping having a fluid-mixing region where fluids of different temperatures are mixed.

To solve the above problem, piping of the present invention having a fluid-mixing region employs the following solutions.

That is, piping having a fluid-mixing region according to the present invention includes a first pipe and an inner pipe including an end portion disposed in the first pipe substantially on a central axis of the first pipe. An inner fluid flows through the inner pipe at a lower velocity than an outer fluid flowing outside the end portion. The inner and outer fluids have different temperatures. The inner and outer fluids are mixed in the fluid-mixing region downstream of the inner pipe. The inner pipe has a weld formed to connect the end portion and a downstream portion together. The distance between the weld and a downstream end of the end portion is equal to or larger than the inner diameter of the first pipe.

Because the inner fluid flowing through the inner pipe has a lower velocity than the outer fluid, the outer fluid flows back into the inner pipe. If the outer fluid flowing back into the inner pipe reaches the vicinity of the weld of the inner pipe, it causes temperature fluctuations due to temperature variations at the weld, thus leading to thermal fatigue. This results in a decreased lifetime because the weld has a lower fatigue strength than the unwelded portion where no welding is made and thus easily suffers breakage.

In the present invention, the distance between the weld and the downstream end of the end portion of the inner pipe is equal to or larger than the inner diameter of the first pipe. This prevents the backflow of the outer fluid from reaching the vicinity of the weld and thus prevents breakage due to thermal fatigue at the weld.

Other piping of the present invention having a fluid-mixing region includes a first pipe and an inner pipe including an end portion disposed in the first pipe substantially on a central axis of the first pipe. An inner fluid flows through the inner pipe at a lower velocity than an outer fluid flowing outside the end portion. The inner and outer fluids have different temperatures. The inner and outer fluids are mixed in the fluid-mixing region downstream of the inner pipe. A small-diameter portion is provided at a downstream end of the end portion of the inner pipe and has a smaller inner diameter than the upstream side thereof.

The small-diameter portion, provided at the downstream end of the end portion of the inner pipe, further accelerates the inner fluid flowing through the inner pipe. This prevents the outer fluid from flowing back into the inner pipe.

To facilitate the mixing of the fluids, additionally, swirling part may be provided upstream of the downstream end of the inner pipe to apply a swirling force to the outer fluid about the central axis.

Other piping of the present invention having a fluid-mixing region includes a first pipe and an inner pipe including an end portion disposed in the first pipe substantially on a central axis of the first pipe. An inner fluid flows through the inner pipe and has a temperature different from that of an outer fluid flowing outside the end portion. The inner and outer fluids are mixed in the fluid-mixing region downstream of the inner pipe. An inner cylinder is disposed in the inner pipe and has a downstream end positioned downstream of a downstream end of the inner pipe, and a gap is formed between the inner cylinder and an inner wall of the inner pipe.

The inner cylinder is disposed in the inner pipe with the gap formed between the inner wall of the inner pipe and the inner cylinder. As a result, the inner fluid is split into a peripheral flow between the outside of the inner cylinder and the inside of the inner pipe and a central flow through the inside of the inner cylinder.

The peripheral flow, split from the central flow, forms a thin layer which facilitates the mixing with the outer fluid.

The central flow, split from the peripheral flow, emerges from the downstream end of the inner cylinder and forms a flow having a small cross-sectional area (i.e., a narrow flow) which facilitates the mixing with the outer fluid.

In addition, the downstream end of the inner cylinder is disposed downstream of the downstream end of the inner pipe, so that the mixing is performed in two steps: first, mixing the peripheral flow with the outer fluid, and second, mixing the central flow with the outer fluid. This further facilitates the mixing with the outer fluid.

Preferably, the above piping further includes swirling part fixed between the inner circumferential wall of the inner pipe and an outer circumferential wall of the inner cylinder to apply a swirling force to the fluid about the central axis.

The swirling part applies a swirling force to the peripheral portion of the inner fluid flowing between the outside of the inner cylinder and the inside of the inner pipe. This facilitates the mixing with the outer fluid.

In addition, the inner cylinder can reliably be supported because the swirling part is provided between the inner circumferential wall of the inner pipe and the outer circumferential wall of the inner cylinder so as to hold the inner cylinder.

Other piping of the present invention having a fluid-mixing region includes a first pipe and an inner pipe including an end portion disposed in the first pipe substantially on a central axis of the first pipe. An inner fluid flows through the inner pipe and has a temperature different from that of an outer fluid flowing outside the end portion. The inner and outer fluids are mixed in the fluid-mixing region downstream of the inner pipe. The first pipe includes a bent portion, and the inner pipe extends downstream of the bent portion.

If the bent portion is formed in the first pipe and the region where the inner and outer fluids are mixed is positioned upstream of the bent portion, the fluid that has not yet been sufficiently mixed may collide with the bent portion. In that case, the bent portion would experience temperature fluctuations which could cause thermal stress or thermal fatigue.

In the present invention, therefore, the inner pipe extends downstream of the bent portion, and the fluid-mixing region is provided downstream of the bent portion. This prevents thermal fatigue at the bent portion.

Preferably, the above piping having the fluid-mixing region further includes swirling part fixed between an inner circumferential wall of the first pipe and an outer circumferential wall of the inner pipe to apply a swirling force to the fluid about the central axis.

The swirling part can apply a swirling force to the outer fluid flowing between the outside of the inner pipe and the inside of the first pipe. This facilitates the mixing.

In addition, the inner pipe extends downstream of the bent portion; this may be disadvantageous in terms of the rigidity with which the inner pipe is supported. In the present invention, however, the rigidity with which the inner pipe is supported can be enhanced because the swirling part is provided between the inner circumferential wall of the first pipe and the outer circumferential wall of the inner pipe so as to hold the inner pipe.

Other piping of the present invention having a fluid-mixing region includes a first pipe and an inner pipe including an end portion disposed in the first pipe substantially on a central axis of the first pipe. An inner fluid flows through the inner pipe at a lower velocity than an outer fluid flowing outside the end portion. The inner and outer fluids have different temperatures. The inner and outer fluids are mixed in the fluid-mixing region downstream of the inner pipe. The first pipe includes a wide portion having an increased inner diameter in the fluid-mixing region.

The wide portion of the first pipe decreases the velocity of the outer fluid flowing through the first pipe to reduce the velocity difference between the outer fluid and the inner fluid, which has a lower velocity, thus lowering confluence resistance.

The piping of the present invention having the fluid-mixing region further includes swirling part provided in the wide portion of the first pipe to apply a swirling force to the outer fluid.

The swirling part provided in the wide portion applies a swirling force to the outer fluid to facilitate the mixing with the inner fluid.

Other piping of the present invention having a fluid-mixing region includes a first pipe and an inner pipe including an end portion disposed in the first pipe substantially on a central axis of the first pipe. An inner fluid flows through the inner pipe at a higher velocity than an outer fluid flowing outside the end portion. The inner and outer fluids have different temperatures. The inner and outer fluids are mixed in the fluid-mixing region downstream of the inner pipe. A wide pipe whose inner diameter increases gradually downstream is provided at an end of the inner pipe.

The wide pipe is provided at the end of the inner pipe to decrease the velocity of the inner fluid. This reduces the velocity difference between the inner fluid and the outer fluid, which has a lower velocity, thus lowering confluence resistance.

In each of the piping having the fluid-mixing region described above, the inner pipe has intake part for taking in part of the unmixed fluid before the fluid reaches the fluid-mixing region.

The inner pipe has the inlet for taking in part of the fluid (for example, the outer fluid or a fluid flowing from the upstream side of the first pipe) before the fluid reaches the fluid-mixing region. The unmixed fluid flowing into the inner pipe through the intake part is mixed with the inner fluid flowing through the inner pipe. The fluid thus mixed flows out of the end of the inner pipe and is mixed again with the outer fluid in the fluid-mixing region. This enables two-step mixing, thus reducing confluence resistance.

The intake part used is, for example, an opening formed in the wall of the inner pipe or a bypass pipe joined to the wall of the inner pipe so as to face the upstream side.

Each of the piping having the fluid-mixing region described above further includes a second pipe joined to the outer wall of the first pipe to guide the inner fluid, and an upstream end of the inner pipe is fixed to an inner circumferential wall of the second pipe.

The fluid flowing through the second pipe enters the inner pipe, which guides the fluid and allows it to be mixed with the outer fluid flowing through the first pipe.

In addition, the inner diameter of the inner pipe, joined to the inner circumferential wall of the second pipe, is smaller than that of the second pipe. The inner pipe thus functions as a reducer.

Alternatively, each of the piping having the fluid-mixing region further includes a second pipe joined to the outer wall of the first pipe to guide the outer fluid, and the upstream end of the inner pipe is fixed to the inner circumferential wall of the first pipe.

The fluid flowing through the first pipe enters the inner pipe, which guides the fluid and allows it to be mixed with the outer fluid flowing from the second pipe into the first pipe.

In addition, the inner diameter of the inner pipe, joined to the inner circumferential wall of the first pipe, is smaller than that of the first pipe. The inner pipe thus functions as a reducer.

The distance between the weld and the downstream end of the inner pipe can be appropriately determined so as not to cause temperature variations near the weld, thus preventing thermal fatigue at the weld, where the fatigue strength is low.

In addition, the small-diameter portion can be provided at the downstream end of the inner pipe to facilitate the mixing of the fluids, thus reducing temperature variations and preventing thermal fatigue.

In addition, the inner cylinder can be provided at the end of the inner pipe to facilitate the mixing of the fluids, thus reducing temperature variations and preventing thermal fatigue.

In addition, the inner pipe can be provided in the first pipe including the bent portion so as to extend downstream of the bent portion, with the fluid-mixing region formed downstream of the bent portion, thus preventing thermal fatigue at the bent portion.

In addition, the wide portion can be provided at the position of the first pipe corresponding to the mixing region to reduce the velocity difference between the inner and outer fluids, thus lowering confluence resistance. This facilitates the mixing of the fluids and reduces temperature variations to prevent thermal fatigue.

If the inner fluid has a higher velocity than the outer fluid, the wide pipe can be provided at the end of the inner pipe to decrease the velocity of the inner fluid and reduce the velocity difference between the inner and outer fluids, thus lowering confluence resistance. This facilitates the mixing of the fluids and reduces temperature variations to prevent thermal fatigue.

In addition, the intake part for taking in part of the unmixed fluid before the fluid reaches the fluid-mixing region can be provided in the inner pipe to perform the mixing of the inner and outer fluids in two steps, thus lowering confluence resistance. This facilitates the mixing of the fluids and reduces temperature variations to prevent thermal fatigue.

EXPLANATION OF REFERENCE SIGNS

Figure 1:
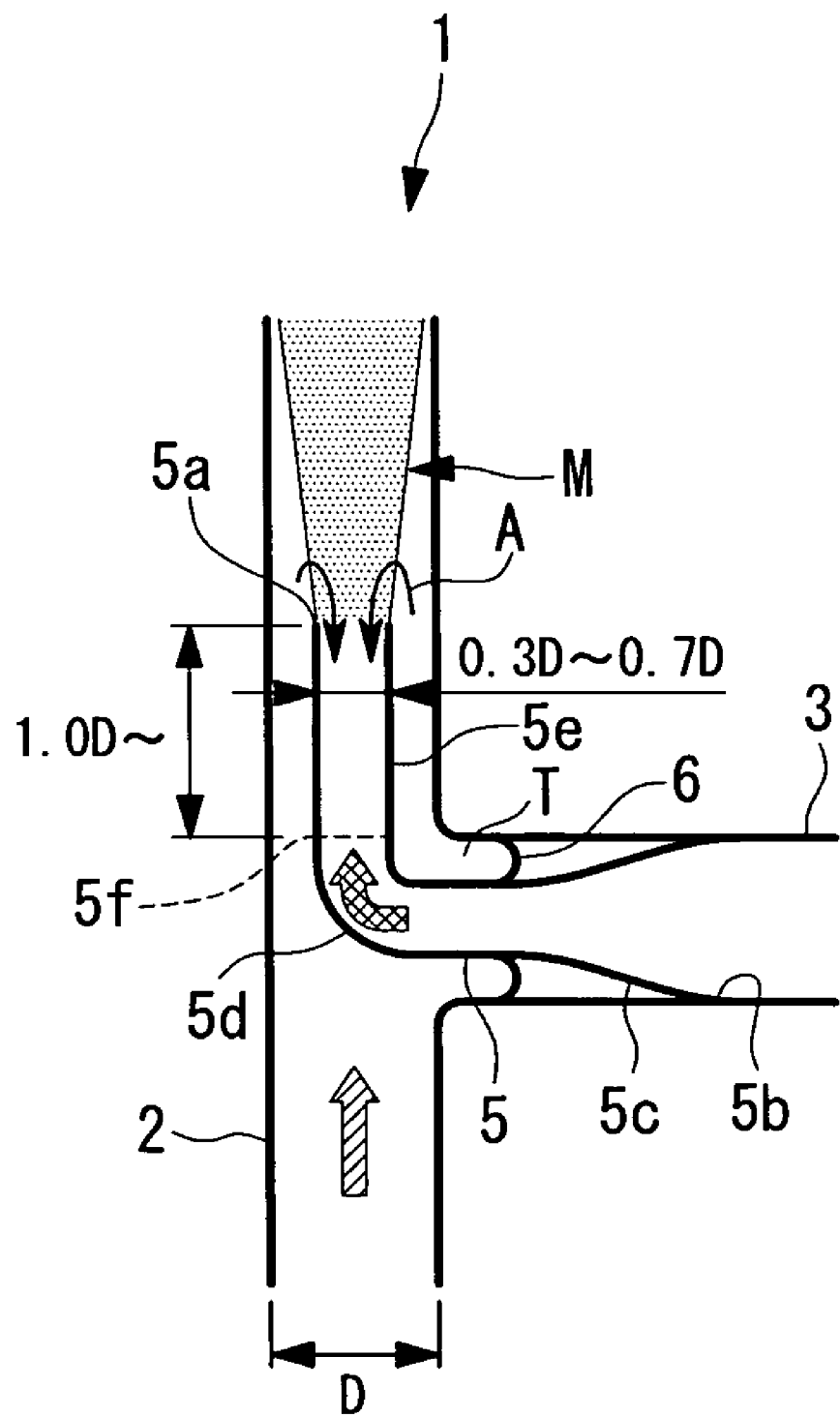
FIG. 1 is a longitudinal sectional view showing a first embodiment of the present invention.

1: piping
2: main pipe (first pipe)
2a: bent portion
2b: wide portion
2c: large-diameter pipe (wide portion)
3: branch pipe (second pipe)
5: reducer (inner pipe)
5a: downstream end
5e: end portion
5f: weld line (weld)
5g: small-diameter portion
8, 12, 14: swirling vane (swirling part)
10: inner cylinder
20: stator vane
22: wide pipe
24: bypass pipe (intake part)
M: fluid-mixing region

BEST MODE FOR CARRYING OUT THE INVENTION

Embodiments of the present invention will now be described with reference to the drawings.

First Embodiment

A first embodiment of the present invention will now be described with reference to FIG. 1.

FIG. 1 shows piping 1 having a fluid-mixing region M.

The piping 1 includes a main pipe (first pipe) 2 and a branch pipe (second pipe) 3.

The main pipe 2 has an inner diameter D and is formed of metal. In FIG. 1, high-temperature water (high-temperature fluid) flows from bottom to top.

The branch pipe 3 is connected to an outer wall of the main pipe 2 perpendicularly. The branch pipe 3 is formed of metal, and low-temperature water (low-temperature fluid) having a lower temperature than the high-temperature water flowing through the main pipe 2 flows through the branch pipe 3. In FIG. 1, the low-temperature water flows from right to left in the branch pipe 3, passes through a reducer (inner pipe) 5, and flows into the main pipe 2 through a downstream end 5a of the reducer S.

An upstream end 5b of the reducer 5 is fixed to an inner wall of the branch pipe 3. The reducer 5 includes a funnel-like portion 5c whose inner diameter decreases gradually from the upstream end 5b toward the downstream side, an elbow portion 5d connected to the funnel-like portion 5c and bent perpendicularly, and an end portion 5e connected to the elbow portion 5d and extending linearly to the downstream end 5a.

The end portion 5e and the elbow portion (downstream portion) 5d are connected together by welding and have a weld line (weld) 5f formed at their joint.

The length from the downstream end 5a of the end portion 5e to the weld line 5f is equal to or larger than the inner diameter D of the main pipe 2. In addition, the inner diameter of the end portion 5e is 0.3 to 0.7 times the inner diameter D of the main pipe 2.

A concave portion 6 is provided between the inner wall of the branch pipe 3 and the outer wall of the reducer 5. This concave portion 6 forms a stagnation region T at the joint between the main pipe 2 and the branch pipe 3. The high-temperature water in the main pipe 2 stagnates in the stagnation region T, where it prevents a supply of new high-temperature water. In addition, the high-temperature water retained in that region T radiates heat toward the low-temperature water. Thus, a thermal sleeve is formed to reduce temperature variations.

In the piping 1 thus configured, the high-temperature water flows through the main pipe 2 from bottom to top while the low-temperature water flows through the branch pipe 3 from right to left. The high-temperature water flowing through the main pipe 2 has a higher velocity than the low-temperature water flowing through the branch pipe 3.

The high-temperature water flowing through the main pipe 2 flows upward along the periphery of the reducer 5. Some of the high-temperature water is retained in the stagnation region T formed at the joint between the main pipe 2 and the branch pipe 3.

The low-temperature water flowing through the branch pipe 3 enters the funnel-like portion 5c through the upstream end 5b of the reducer 5. The funnel-like portion 5c, whose inner diameter decreases gradually, accelerates the low-temperature water. The elbow portion 5d bends the flow direction of the low-temperature water passing through the funnel-like portion 5c at a right angle before it flows to the end portion 5e. The low-temperature water then flows out of the downstream end 5a of the end portion 5e.

The low-temperature water flowing out of the downstream end 5a is mixed with the high-temperature water flowing along the periphery of the reducer 5 in the mixing region M.

Because the low-temperature water has a lower velocity at the downstream end 5a of the reducer 5 than the high-temperature water does at the same position, the high-velocity, high-temperature water flows from the downstream end 5a of the reducer 5 back to the upstream side, as shown by arrows A in FIG. 1. Hence, some high-temperature water flows back into the reducer 5, thus causing temperature fluctuations due to temperature variations in the end portion 5e of the reducer 5. In this embodiment, however, the high-temperature fluid does not reach the weld line 5f because the length from the downstream end 5a of the reducer 5 to the weld line 5f is equal to or larger than the inner diameter D of the main pipe 2. Therefore, no temperature interface with positional variations is formed near the weld line 5f, where the fatigue strength is lower than in the unwelded portion where no welding is made. This prevents breakage due to thermal fatigue at the weld line 5f.

Figure 2:
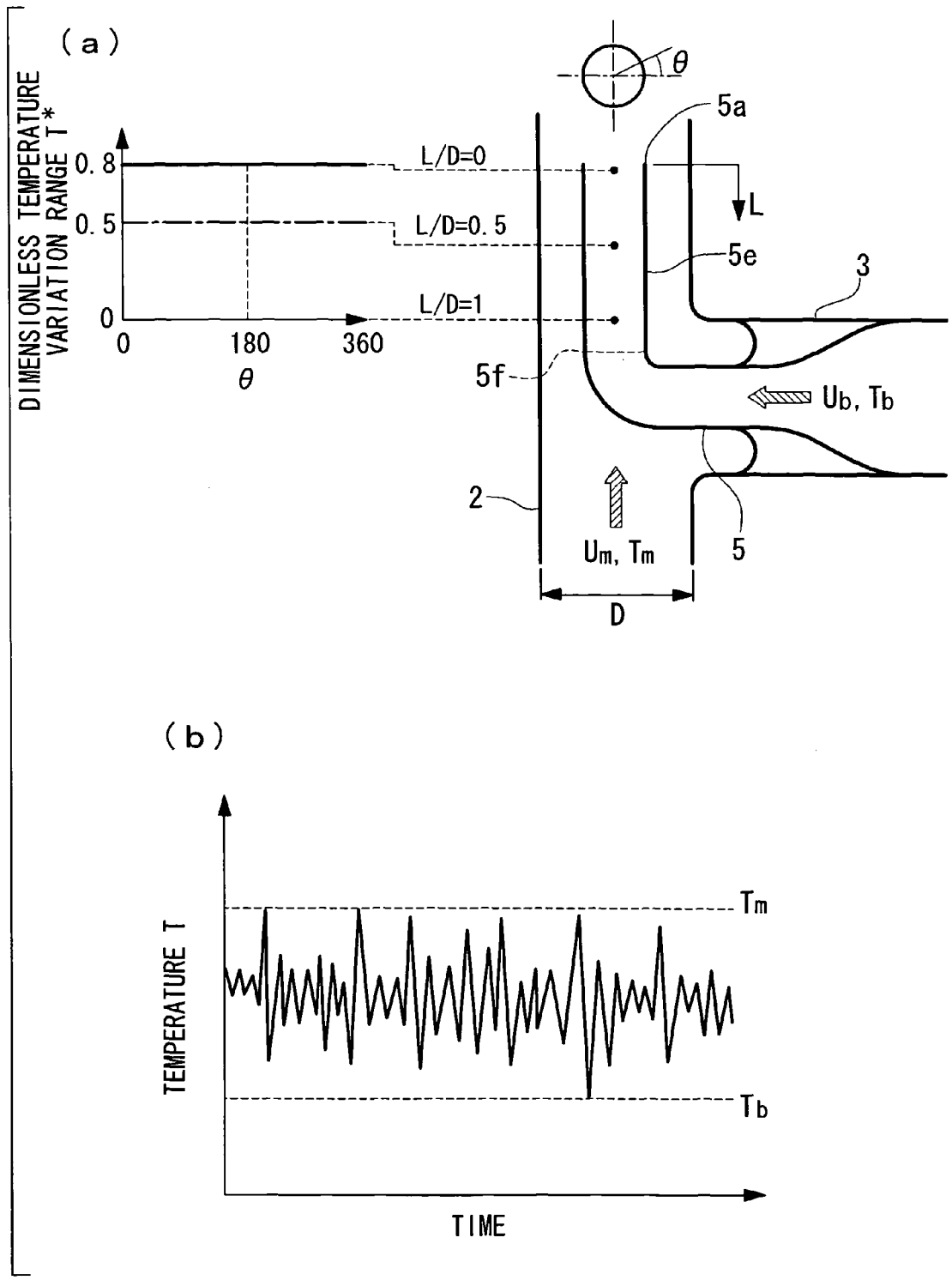
FIG. 2 shows an effect of the present invention: (a) is a graph showing a dimensionless temperature variation range in a reducer; and (b) is a graph showing parameters of the dimensionless temperature variation range.

FIG. 2 illustrates experimental results showing the effect of this embodiment.

The velocity ratio (Ub/Um) of the velocity Ub of the low-temperature water flowing through the branch pipe 3 to the velocity Um of the high-temperature water flowing through the main pipe 2 is 0.05 or less.

The velocity Um of the high-temperature water refers to the velocity upstream of the joint with the branch pipe 3, and the velocity Ub of the low-temperature water refers to the velocity before entry into the reducer 5. At the downstream end 5a of the reducer 5, therefore, the individual velocities have been increased as a result of decreased flow channel areas. This, however, does not change the relationship that the velocity Um of the high-temperature water is higher than the velocity Ub of the low-temperature water at the downstream end 5a of the reducer 5. In this experiment, the velocity ratio at the downstream end 5a of the reducer 5 is about 0.1.

(a) in FIG. 2 shows dimensionless temperature variation ranges T* at positions inside the reducer 5 separated upstream from the downstream end 5a of the reducer 5 by predetermined lengths.

The dimensionless temperature variation range T* is defined by the following equation:

$$T^* = (T-Tb)/(Tm-Tb)$$

where T is fluid temperature, Tm is the temperature of the high-temperature water flowing through the main pipe 2, and Tb is the temperature of the low-temperature water flowing through the branch pipe 3.

(b) in FIG. 2 shows the relationship between varying fluid temperatures T and the velocities Tm and Tb of the high-temperature water and the low-temperature water.

The graph on the left of (a) in FIG. 2 shows the dimensionless temperature variation range T* at a circumferential position θ of the end portion 5e of the reducer 5. This graph reveals that the dimensionless temperature variation range T* is 0.8 at the downstream end 5a of the reducer 5 (L/D=0) irrespective of the circumferential position θ. The dimensionless temperature variation range T* is 0.5 at a position separated upstream from the downstream end 5a of the reducer 5 by half the inner diameter D of the main pipe 2 (L/D=0.5) irrespective of the circumferential position θ. The dimensionless temperature variation range T* is 0 at a position further separated upstream from the downstream end 5a of the reducer 5, namely, by the inner diameter D of the main pipe 2 (L/D=1), irrespective of the circumferential position θ. This demonstrates that no temperature variations are found at positions separated upstream from the downstream end 5a of the reducer 5 by more than the inner diameter D of the main pipe 2. Hence, if the length from the downstream end 5a of the reducer 5 to the weld line 5f is equal to or larger than the inner diameter D of the main pipe 2 as in this embodiment, the high-temperature fluid does not reach the weld line 5f, which therefore suffers no breakage due to thermal fatigue.

Second Embodiment

Next, a second embodiment of the present invention will now be described with reference to FIG. 3.

This embodiment differs from the first embodiment in that a small-diameter portion 5g is provided at the end portion 5e of the reducer 5, and the other features are identical. Hence, the identical portions will not be described.

Figure 3:
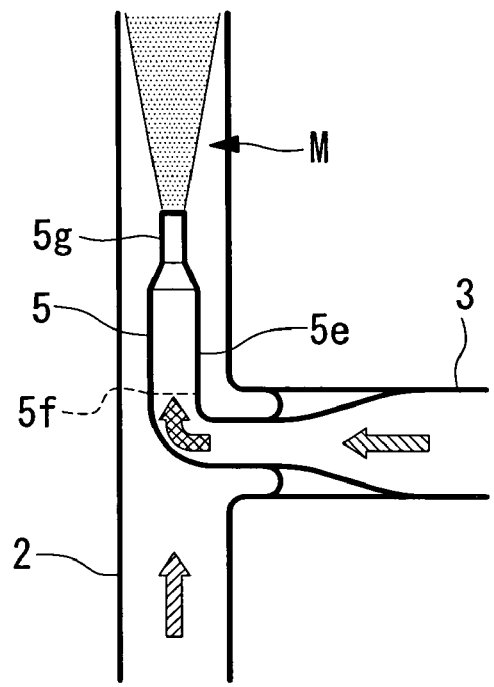
FIG. 3 is a longitudinal sectional view showing a second embodiment of the present invention.

Referring to FIG. 3, the small-diameter portion 5g is provided on the downstream side of the end portion 5e of the reducer 5 and has a smaller inner diameter than the upstream side thereof. The small-diameter portion 5g further accelerates the low-temperature water flowing through the branch pipe 3 and guided into the reducer 5. This prevents the high-temperature water flowing along the outside of the reducer 5 from flowing back into the reducer 5. Thus, no temperature interface reaches a deep level inside the reducer 5, so that the possibility of breakage at the weld line 5f due to thermal fatigue is eliminated.

Figure 4:
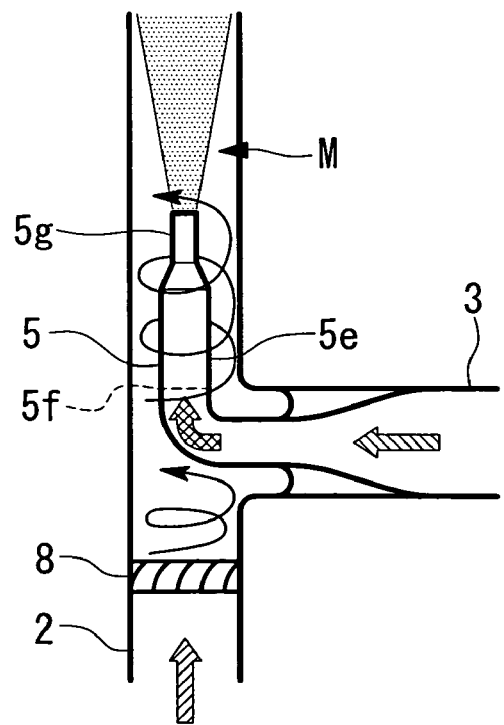
FIG. 4 is a longitudinal sectional view showing a modification of FIG. 3.

FIG. 4 shows a modification of this embodiment. Specifically, swirling vanes (swirling part) 8 are added to the structure of FIG. 3. These swirling vanes 8 are disposed inside the main pipe 2 upstream of the joint with the branch pipe 3. The swirling vanes 8 apply a swirling force to the high-temperature fluid flowing through the main pipe 2 about the axis of the main pipe 2. This causes the high-temperature fluid flowing through the main pipe 2 to swirl around the reducer 5, thus facilitating the mixing with the low-temperature fluid flowing out of the reducer 5 in the fluid-mixing region M.

Although the high-temperature water flows through the main pipe 2 and the low-temperature water flows through the branch pipe 3 in this embodiment, the present invention is not limited thereto, and a configuration in which the low-temperature water flows through the main pipe 2 and the high-temperature water flows through the branch pipe 3 is also possible.

Third Embodiment

Next, a third embodiment of the present invention will now be described with reference to FIG. 5.

This embodiment differs from the first embodiment in that an inner cylinder 10 is provided at the end of the reducer 5, and the other features are identical. Hence, the identical portions will not be described.

Figure 5:
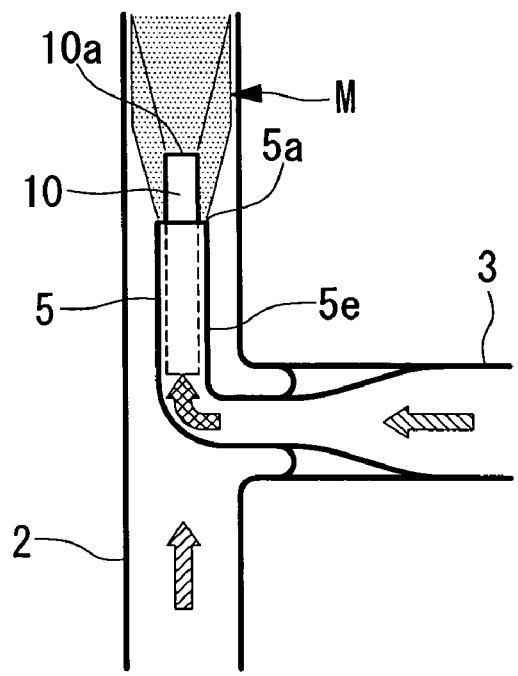
FIG. 5 is a longitudinal sectional view showing a third embodiment of the present invention.

Referring to FIG. 5, the inner cylinder 10 is inserted in the end portion 5e of the reducer 5. A downstream end 10a of the inner cylinder 10 is disposed downstream of the downstream end 5a of the reducer 5. A gap having an annular cross section is formed between the outer circumferential wall of the inner cylinder 10 and the inner circumferential wall of the end portion 5e of the reducer 5.

In this embodiment, because the inner cylinder 10 is disposed in the reducer 5 with the gap formed between the inner circumferential wall of the reducer 5 and the outer circumferential wall of the inner cylinder 10, the low-temperature water flowing through the reducer 5 is split into a peripheral flow between the outside of the inner cylinder 10 and the inside of the reducer 5 and a central flow through the inside of the inner cylinder 10.

The peripheral flow, split from the central flow by the inner cylinder 10, forms a thin layer which facilitates the mixing of the peripheral flow emerging from the downstream end of the reducer 5 with the high-temperature water flowing outside the reducer 5.

The central flow, split from the peripheral flow by the inner cylinder 10, emerges from the downstream end 10a of the inner cylinder 10 and forms a flow having a small cross-sectional area (i.e., a narrow flow) which facilitates the mixing with the high-temperature water.

In addition, the downstream end 10a of the inner cylinder 10 is disposed downstream of the downstream end 5a of the reducer 5, so that the mixing is performed in two steps: first, mixing the peripheral flow with the high-temperature water, and second, mixing the central flow with the high-temperature water. This further facilitates the mixing with the high-temperature water.

Figure 6:
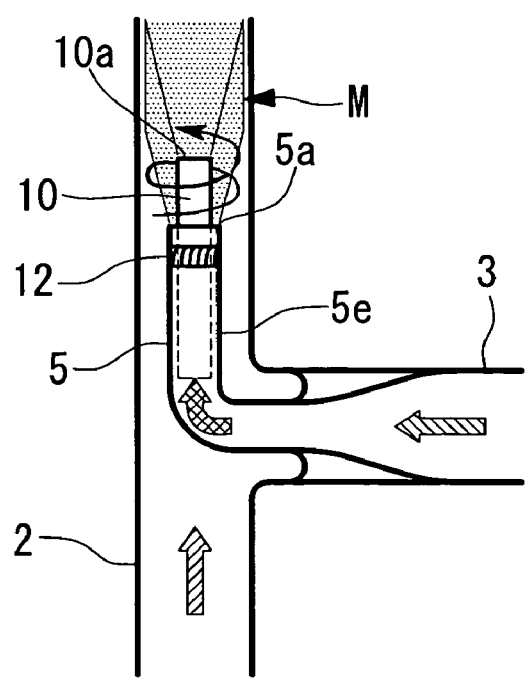
FIG. 6 is a longitudinal sectional view showing a modification of FIG. 5.

FIG. 6 shows a modification of this embodiment. Specifically, swirling vanes 12 are added to the structure of FIG. 5. These swirling vanes 12 are fixed between the outer circumferential wall of the inner cylinder 10 and the inner circumferential wall of the reducer 5.

The swirling vanes 12 thus provided can apply a swirling force to the peripheral flow of the low-temperature water between the outside of the inner cylinder 10 and the inside of the reducer 5. This facilitates the mixing with the high-temperature water.

In addition, the inner cylinder 10 can reliably be supported because the swirling vanes 12 are provided between the inner circumferential wall of the reducer 5 and the outer circumferential wall of the inner cylinder 10 so as to hold the inner cylinder 10.

Unlike the first and second embodiments, the relationship between the velocity of the high-temperature water flowing through the main pipe 2 and the velocity of the low-temperature water flowing through the branch pipe 3 may be reversed in this embodiment. That is, the high-temperature water flowing through the main pipe 2 may have a lower velocity than the low-temperature water flowing through the branch pipe 3.

Although the high-temperature water flows through the main pipe 2 and the low-temperature water flows through the branch pipe 3 in this embodiment, the present invention is not limited thereto, and a configuration in which the low-temperature water flows through the main pipe 2 and the high-temperature water flows through the branch pipe 3 is also possible.

Fourth Embodiment

Next, a fourth embodiment of the present invention will now be described with reference to FIG. 7.

This embodiment differs from the first embodiment in that the downstream side of the main pipe 2 and the downstream side of the reducer 5 are bent, and the other features are identical. Hence, the identical portions will not be described.

This embodiment relates to the case where the downstream side of the main pipe 2 is bent.

Figure 7:
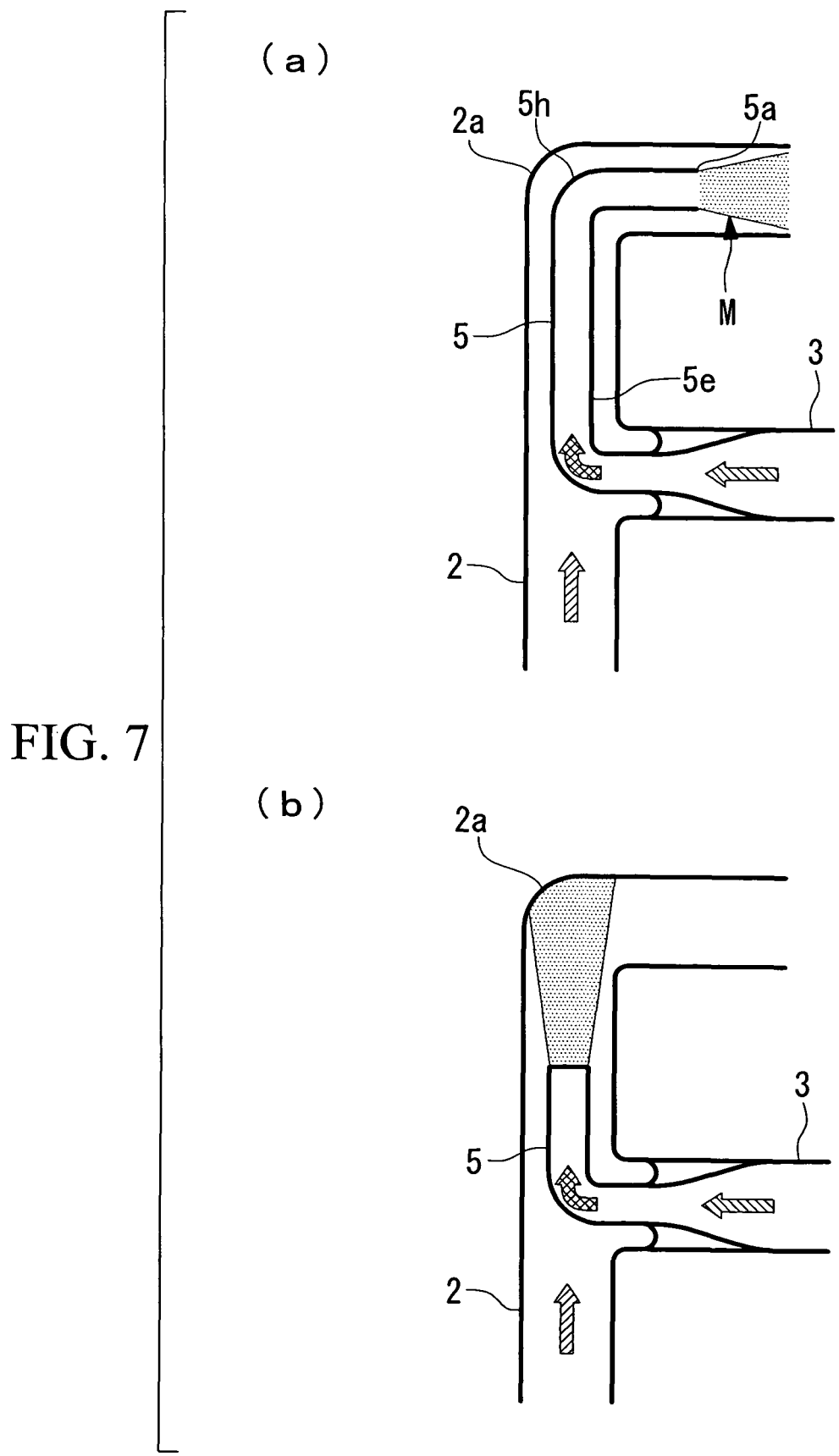
FIG. 7(a) in FIG. 7 is a longitudinal sectional view showing a fourth embodiment of the present invention; and (b) in FIG. 7(b) is a longitudinal sectional view showing a reference example.

Referring to (b) in FIG. 7, if the downstream side of the main pipe 2 is bent at a bent portion 2a, the low-temperature fluid flowing out of the reducer 5 may collide with the bent portion 2a before being sufficiently mixed with the high-temperature fluid. In that case, the bent portion 2a would experience temperature fluctuations which could cause thermal stress or thermal fatigue.

In this embodiment, in contrast, the end portion 5e of the reducer 5 extends downstream of the bent portion 2a of the main pipe 2, as shown in (a) in FIG. 7. Thus, a bent portion 5h is provided in the end portion 5e of the reducer 5, with its downstream end 5a positioned downstream of the bent portion 2a of the main pipe 2. Accordingly, the fluid-mixing region M is provided downstream of the bent portion 2a of the main pipe 2. This prevents thermal fatigue that could occur at the bent portion 2a of the main pipe 2, as in (b) in FIG. 7.

Figure 8:
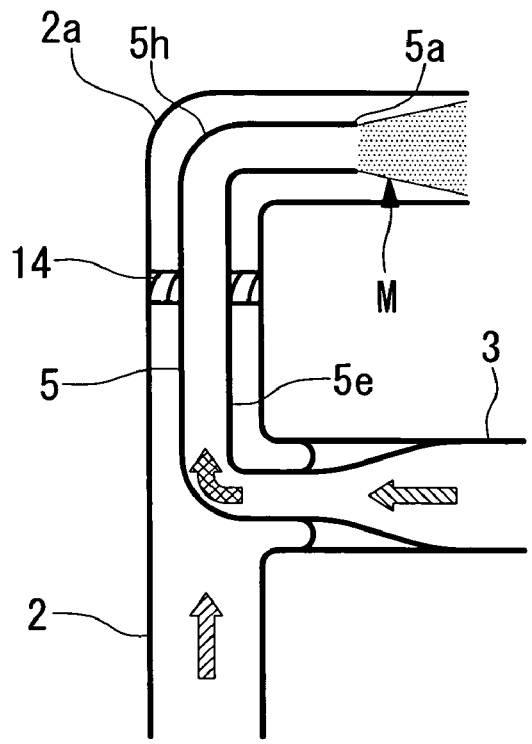
FIG. 8 is a longitudinal sectional view showing a modification of (a) in FIG. 7.

FIG. 8 shows a modification of this embodiment. Specifically, swirling vanes (swirling part) 14 are added to the structure of (a) in FIG. 7. These swirling vanes 14 are fixed between the inner circumferential wall of the main pipe 2 and the outer circumferential wall of the reducer 5. Preferably, the swirling vanes 14 are provided on the end portion 5e of the reducer 5 upstream of the bent portion 5h.

The swirling vanes 14 thus provided can apply a swirling force to the high-temperature water flowing between the outside of the reducer 5 and the inside of the main pipe 2. This facilitates the mixing.

In addition, the reducer 5 extends downstream of the bent portion 2a of the main pipe 2; this may be disadvantageous in terms of the rigidity with which the end portion 5e of the reducer 5 is supported. In this modification, however, the rigidity with which the reducer 5 is supported can be enhanced because the swirling vanes 14 are provided between the inner circumferential wall of the main pipe 2 and the outer circumferential wall of the reducer 5 so as to hold the end portion 5e of the reducer 5.

Unlike the first and second embodiments, the relationship between the velocity of the high-temperature water flowing through the main pipe 2 and the velocity of the low-temperature water flowing through the branch pipe 3 may be reversed in this embodiment. That is, the high-temperature water flowing through the main pipe 2 may have a lower velocity than the low-temperature water flowing through the branch pipe 3.

Although the high-temperature water flows through the main pipe 2 and the low-temperature water flows through the branch pipe 3 in this embodiment, the present invention is not limited thereto, and a configuration in which the low-tem-

Fifth Embodiment

Figure 10:
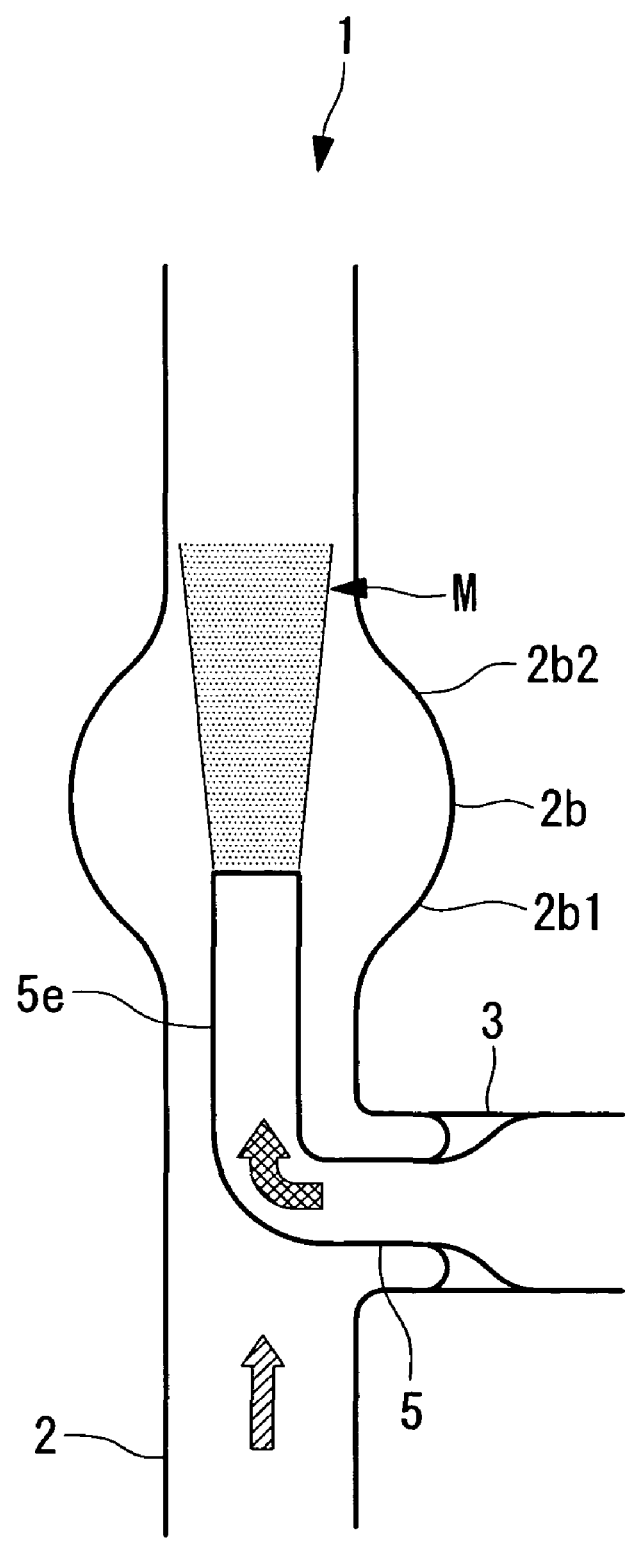
FIG. 10 is a longitudinal sectional view showing a fifth embodiment of the present invention.

Next, a fifth embodiment of the present invention will now be described with reference to FIG. 10.

This embodiment differs from the first embodiment in that a wide portion 2b is formed in the main pipe 2, and the other features are identical. Hence, the identical portions will not be described.

The wide portion 2b is provided at the position of the main pipe 2 corresponding to the fluid-mixing region M. The wide portion 2b has a larger inner diameter than the upstream side of the main pipe 2. The downstream side of the wide portion 2b is connected to a portion of the main pipe 2 which has the same inner diameter as before the wide portion 2b. The wide portion 2b decreases the velocity of the high-temperature water flowing through the main pipe 2 in the fluid-mixing region M to reduce the velocity difference between the high-temperature water and the low-temperature water, which has a lower velocity and flows out of the end portion 5e of the reducer 5, thus lowering confluence resistance.

In addition, an upstream curved portion 2b1 having a gradually increasing inner diameter is provided on the upstream side of the wide portion 2b while a downstream curved portion 2b2 having a gradually decreasing inner diameter is provided on the downstream side of the wide portion 2b. This allows for smooth deceleration and acceleration of the high-temperature water, thus minimizing fluid loss.

Figure 11:
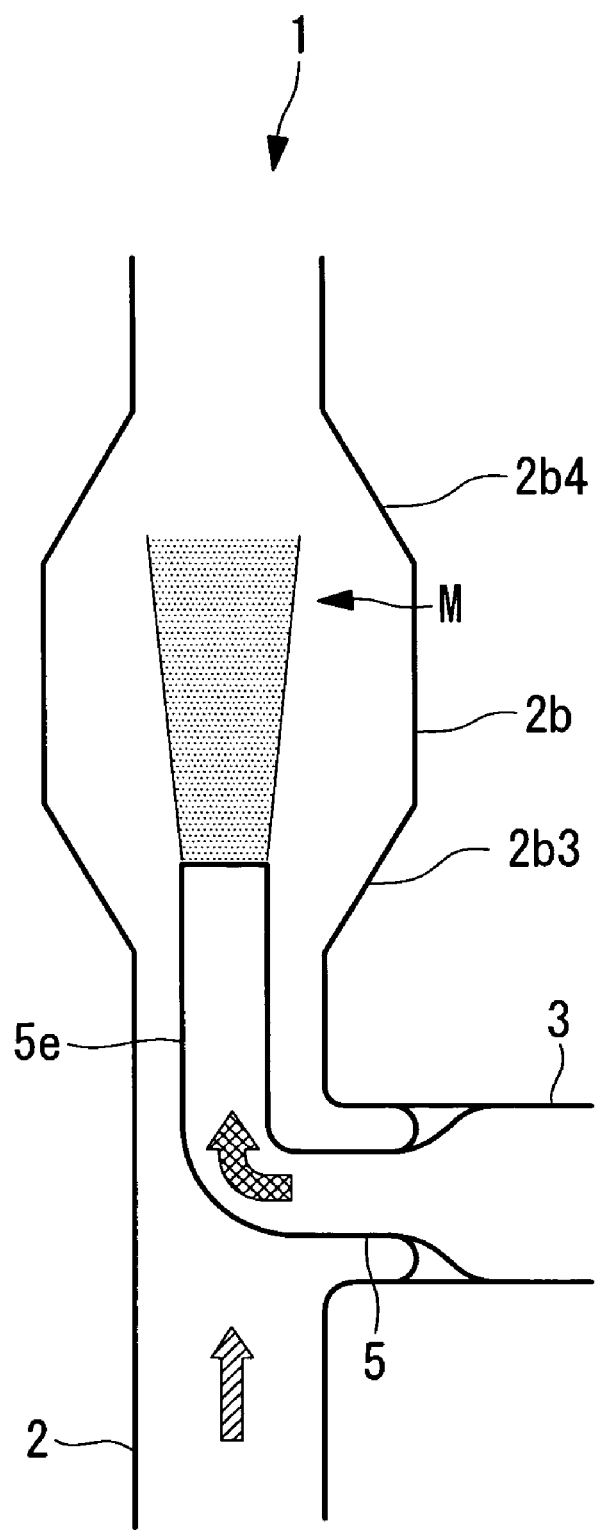
FIG. 11 is a longitudinal sectional view showing a modification of FIG. 10.

Referring to FIG. 11, alternatively, the wide portion 2b may have a reducer shape. Specifically, an upstream conical portion 2b3 whose inner diameter increases gradually at a constant rate is provided on the upstream side of the wide portion 2b while a downstream conical portion 2b4 whose inner diameter decreases gradually at a constant rate is provided on the downstream side of the wide portion 2b. This allows for smooth deceleration and acceleration of the high-temperature water, as in the embodiment of FIG. 10, thus minimizing the fluid loss.

Figure 12:
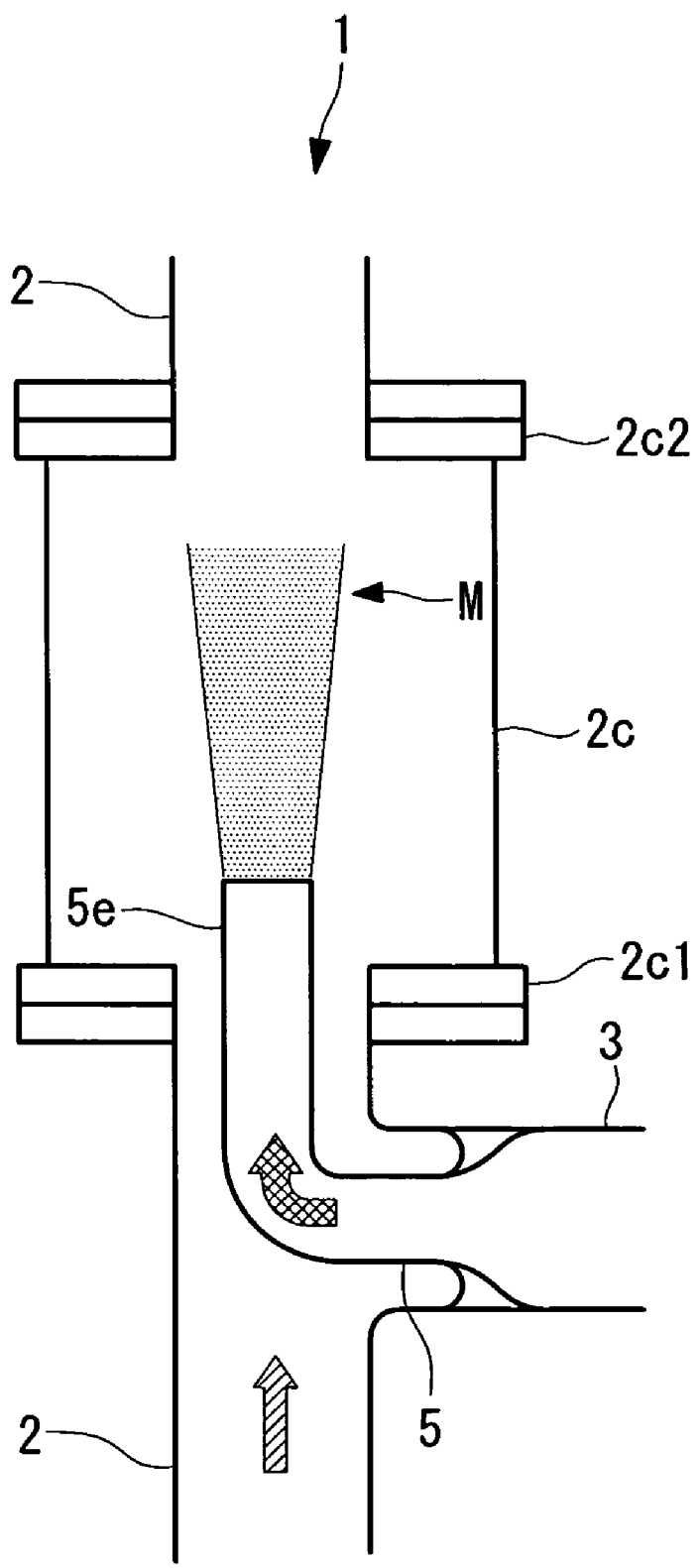
FIG. 12 is a longitudinal sectional view showing a modification of FIG. 10.

Referring to FIG. 12, alternatively, a large-diameter pipe 2c having a larger inner diameter than the main pipe 2 may be provided at the position corresponding to the fluid-mixing region M. The large-diameter pipe 2c is a cylindrical metal pipe that is slightly longer than the fluid-mixing region M. Flanges 2c1 and 2c2 are provided at the upstream and downstream ends, respectively, of the large-diameter pipe 2c and are joined to upstream and downstream main pipes 2, respectively. Thus, a large-diameter portion can be provided simply by flange connection of the large-diameter pipe 2c, having the flanges 2c1 and 2c2, to the main pipes 2. This reduces the steps in the installation operation, as well as installation costs.

Figure 13:
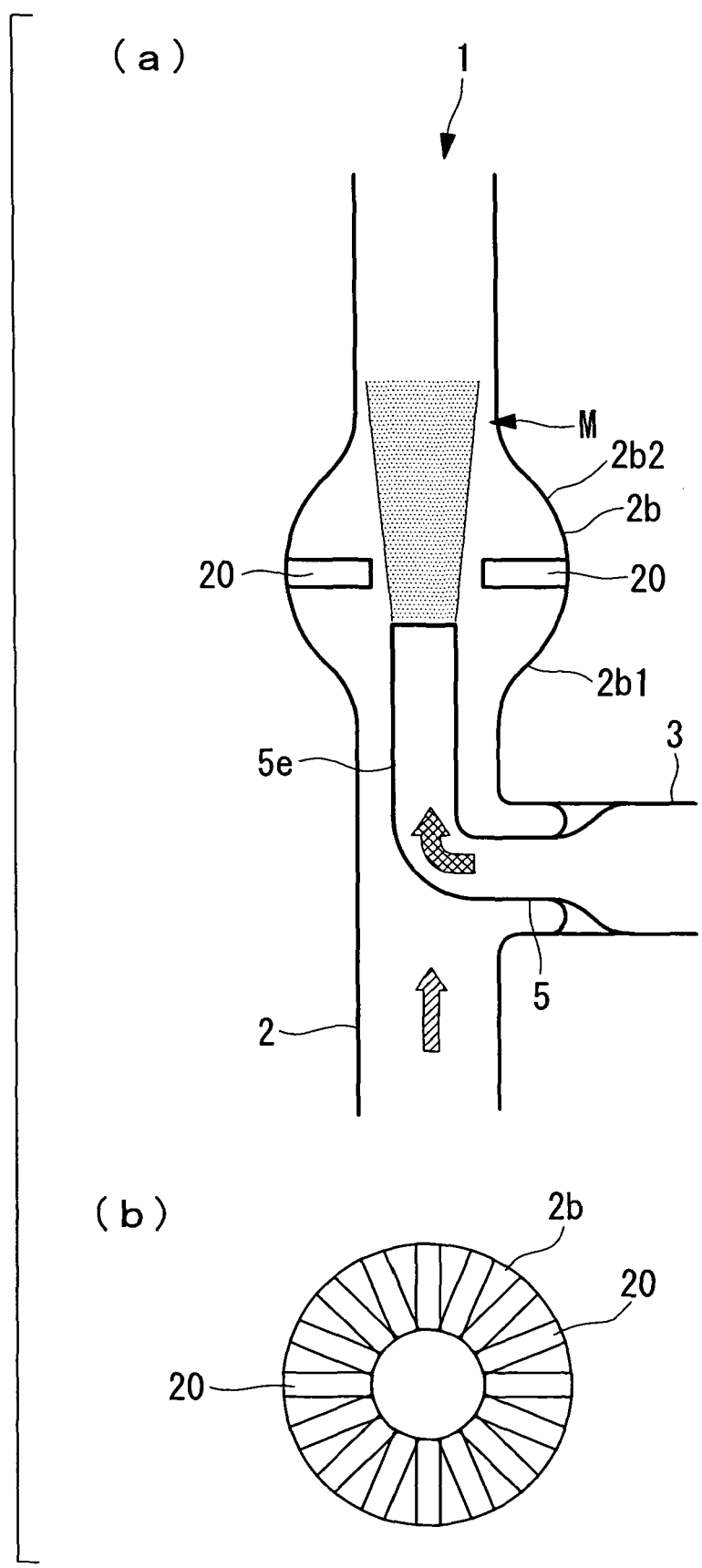
FIG. 13 shows a modification of FIG. 10: (a) is a longitudinal sectional view; and (b) is a transverse sectional view of a wide portion.

Referring to FIG. 13, alternatively, stator vanes 20 may be installed in the wide portion 2b. The plurality of stator vanes (swirling part) 20 are arranged so as to extend radially, as shown (b) in FIG. 13, which is a cross-sectional view of the wide portion 2b. These stator vanes 20 apply a swirling force to the high-temperature water to facilitate the mixing with the low-temperature water.

Although the high-temperature water flows through the main pipe 2 and the low-temperature water flows through the branch pipe 3 in this embodiment, the present invention is not limited thereto, and a configuration in which the low-temperature water flows through the main pipe 2 and the high-temperature water flows through the branch pipe 3 is also possible.

Sixth Embodiment

Next, a sixth embodiment of the present invention will now be described with reference to FIG. 14.

This embodiment differs from the first embodiment in that a wide pipe 22 is formed at the end of the reducer 5 in the case where the low-temperature fluid flowing through the branch pipe 3 has a higher velocity than the high-temperature fluid flowing through the main pipe 2, and the other features are identical. Hence, the identical portions will not be described.

Figure 14:
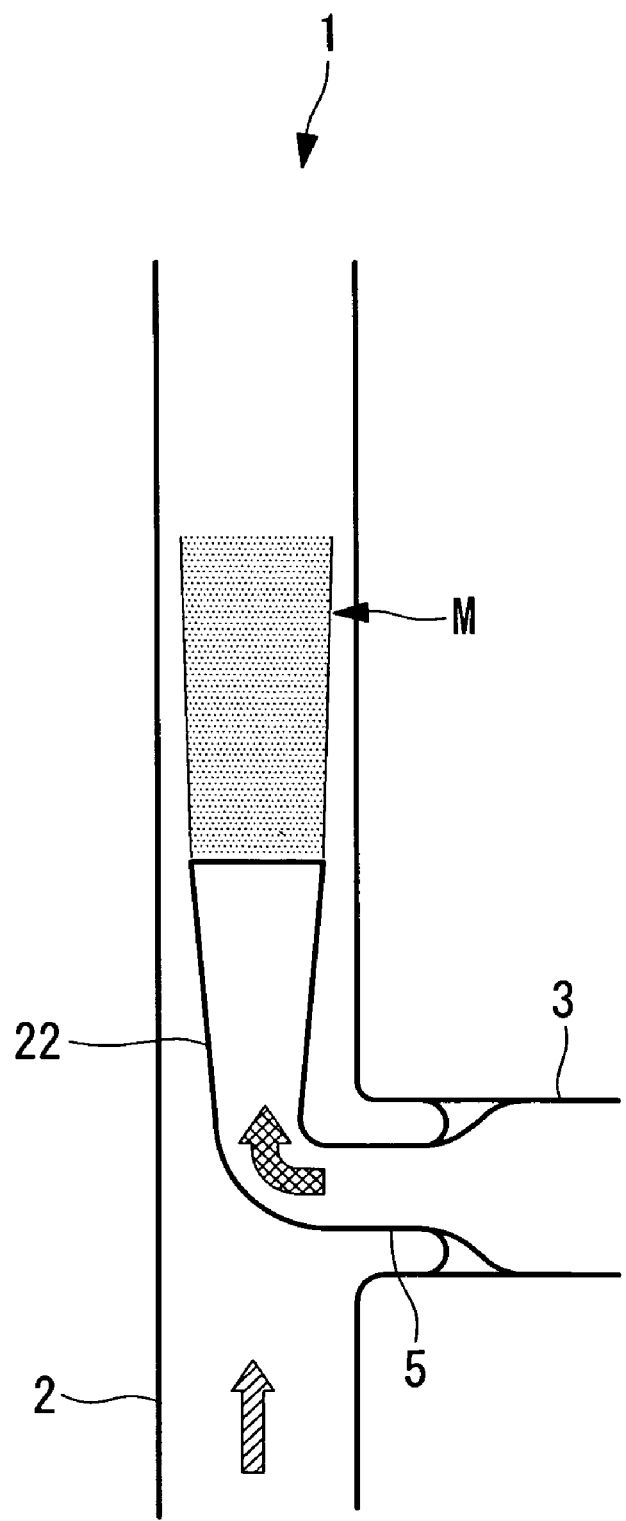
FIG. 14 is a longitudinal sectional view showing a sixth embodiment of the present invention.

Referring to FIG. 14, the wide pipe 22 is formed at the end of the reducer 5 so as to extend along the central axis of the main pipe 2. The wide pipe 22 is a conical metal pipe whose inner diameter increases gradually toward its downstream end. The wide pipe 22 decreases the velocity of the low-temperature water flowing through the wide pipe 22. Conversely, the velocity of the high-temperature water is increased in a region having an annular cross section between the wide pipe 22 and the main pipe 2 because this region is gradually narrowed. This reduces the velocity difference between the low-temperature fluid and the high-temperature fluid, which has a lower velocity and flows through the main pipe 2, thus lowering the confluence resistance in the fluid-mixing region M.

Although the high-temperature water flows through the main pipe 2 and the low-temperature water flows through the branch pipe 3 in this embodiment, the present invention is not limited thereto, and a configuration in which the low-temperature water flows through the main pipe 2 and the high-temperature water flows through the branch pipe 3 is also possible.

Seventh Embodiment

Next, a seventh embodiment of the present invention will now be described with reference to FIG. 15.

This embodiment differs from the first embodiment in that a bypass pipe 24 is connected to the reducer 5, and the other features are identical. Hence, the identical portions will not be described.

Figure 15:
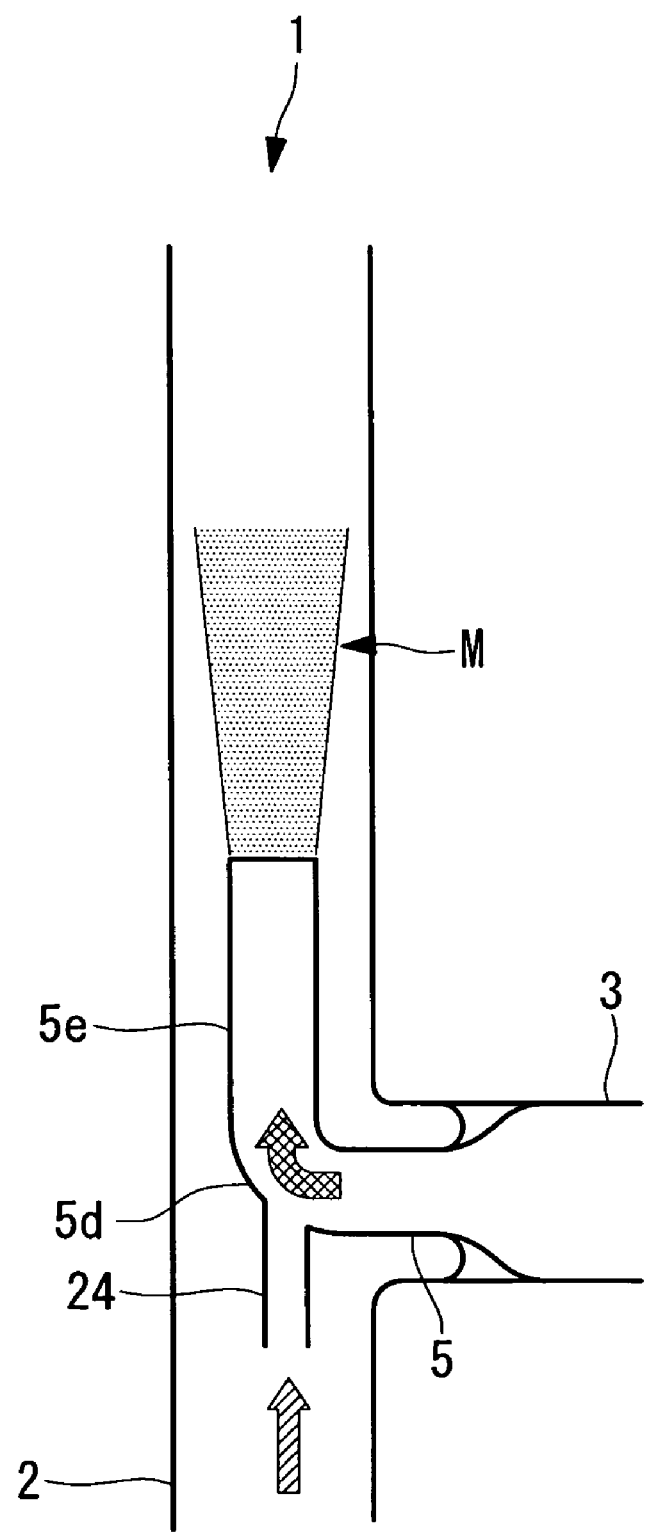
FIG. 15 is a longitudinal sectional view showing a seventh embodiment of the present invention.

Referring to FIG. 15, the elbow portion 5d of the reducer 5 has the bypass pipe (intake part) 24, which extends along the central axis of the main pipe 2 so as to face the upstream side. The bypass pipe 24 is, for example, a cylindrical metal pipe. The reducer 5 can take in the fluid through the bypass pipe 24 before it reaches the fluid-mixing region M. Some of the high-temperature fluid can thus be mixed with the low-temperature water before it reaches the fluid-mixing region M. This enables two-step mixing, which can decrease the temperature difference between the high-temperature water and the low-temperature water stepwise to suppress the temperature difference on the inner metal surface of the pipe. In addition, the confluence resistance can be reduced.

The bypass pipe 24 may be replaced with, for example, an opening formed in the wall of the elbow portion 5d or the end portion 5e.

Unlike the first and second embodiments, the relationship between the velocity of the high-temperature water flowing through the main pipe 2 and the velocity of the low-temperature water flowing through the branch pipe 3 may be reversed in this embodiment. That is, the high-temperature water flowing through the main pipe 2 may have a lower velocity than the low-temperature water flowing through the branch pipe 3.

Although the high-temperature water flows through the main pipe 2 and the low-temperature water flows through the branch pipe 3 in this embodiment, the present invention is not limited thereto, and a configuration in which the low-temperature water flows through the main pipe 2 and the high-temperature water flows through the branch pipe 3 is also possible.

Although water is taken as an example of the fluid flowing through the main pipe 2 and the branch pipe 3 in the description of the first to seventh embodiments, the present invention is not limited thereto.

Figure 9:
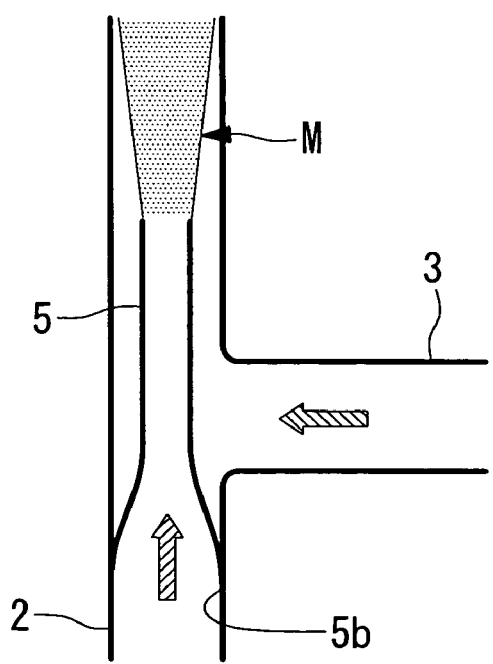
FIG. 9 is a longitudinal sectional view showing a modification of each embodiment.

In addition, although the upstream end 5b of the reducer 5 is joined to the inner circumferential wall of the branch pipe 3 in the description of the first to seventh embodiments, the present invention is not limited thereto. As shown in FIG. 9, for example, the upstream end 5b of the reducer 5 may be joined to a position of the inner circumferential wall of the main pipe 2 upstream of the joint between the branch pipe 3 and the main pipe 2.

The invention claimed is:

1. Piping having a fluid-mixing region and comprising a first pipe and an inner pipe including an end portion disposed in the first pipe substantially on a central axis of the first pipe, an inner fluid flowing through the inner pipe at a lower velocity than an outer fluid flowing outside the end portion, the inner and outer fluids having different temperatures;
   wherein the inner and outer fluids are mixed in the fluid-mixing region downstream of the inner pipe;
   the inner pipe has a weld formed to connect the end portion and a downstream portion together; and
   the distance between the weld and a downstream end of the end portion is equal to or larger than the inner diameter of the first pipe.

2. Piping having a fluid-mixing region and comprising a first pipe and an inner pipe including an end portion disposed in the first pipe substantially on a central axis of the first pipe, an inner fluid flowing through the inner pipe at a lower velocity than an outer fluid flowing outside the end portion, the inner and outer fluids having different temperatures;
   wherein the inner and outer fluids are mixed in the fluid-mixing region downstream of the inner pipe;
   a small-diameter portion is provided at a downstream end of the end portion of the inner pipe and has a smaller inner diameter than the upstream side thereof; and
   the inner pipe has an intake part for taking in part of an unmixed fluid before the fluid reaches the fluid-mixing region.

3. Piping having a fluid-mixing region and comprising a first pipe and an inner pipe including an end portion disposed in the first pipe substantially on a central axis of the first pipe, an inner fluid flowing through the inner pipe and having a temperature different from that of an outer fluid flowing outside the end portion;
   wherein the inner and outer fluids are mixed in the fluid-mixing region downstream of the inner pipe; and
   an inner cylinder is disposed in the inner pipe and has a downstream end positioned downstream of a downstream end of the inner pipe and a gap is formed between the inner cylinder and an inner wall of the inner pipe.

4. The piping having the fluid-mixing region according to claim 3, further comprising swirling part fixed between the inner circumferential wall of the inner pipe and an outer circumferential wall of the inner cylinder to apply a swirling force to the fluid about the central axis.

5. Piping having a fluid-mixing region and comprising a first pipe and an inner pipe including an end portion disposed in the first pipe substantially on a central axis of the first pipe, an inner fluid flowing through the inner pipe and having a temperature different from that of an outer fluid flowing outside the end portion;
   wherein the inner and outer fluids are mixed in the fluid-mixing region downstream of the inner pipe;
   the first pipe includes a bent portion;
   the inner pipe extends downstream of the bent portion; and
   the inner pipe has an intake part for taking in part of an unmixed fluid before the fluid reaches the fluid-mixing region.

6. The piping having the fluid-mixing region according to claim 5, further comprising swirling part fixed between an inner circumferential wall of the first pipe and an outer circumferential wall of the inner pipe to apply a swirling force to the fluid about the central axis.

7. Piping having a fluid-mixing region and comprising a first pipe and an inner pipe including an end portion disposed in the first pipe substantially on a central axis of the first pipe, an inner fluid flowing through the inner pipe at a lower velocity than an outer fluid flowing outside the end portion, the inner and outer fluids having different temperatures, and a second pipe joined to an outer wall of the first pipe to guide the inner fluid;
   wherein the inner and outer fluids are mixed in the fluid-mixing region downstream of the inner pipe; and
   the first pipe includes a wide portion having an increased inner diameter in the fluid-mixing region;
   wherein an upstream end of the inner pipe is fixed to an inner circumferential wall of the second pipe.

8. The piping having the fluid-mixing region according to claim 7, further comprising swirling part provided in the wide portion of the first pipe to apply a swirling force to the outer fluid.

9. Piping having a fluid-mixing region and comprising a first pipe and an inner pipe including an end portion disposed in the first pipe substantially on a central axis of the first pipe, an inner fluid flowing through the inner pipe at a higher velocity than an outer fluid flowing outside the end portion, the inner and outer fluids having different temperatures;
   wherein the inner and outer fluids are mixed in the fluid-mixing region downstream of the inner pipe; and
   a wide pipe whose inner diameter increases gradually downstream is provided at an end of the inner pipe.

10. The piping having the fluid-mixing region according to one of claims 1, 3, 4 and 6-9, wherein the inner pipe has intake part for taking in part of an unmixed fluid before the fluid reaches the fluid-mixing region.

11. The piping having the fluid-mixing region according to one of claims 1-6 and 9, further comprising a second pipe joined to an outer wall of the first pipe to guide the inner fluid;
   wherein an upstream end of the inner pipe is fixed to an inner circumferential wall of the second pipe.

12. The piping having the fluid-mixing region according to one of claims 1 to 9, further comprising a second pipe joined to an outer wall of the first pipe to guide the outer fluid;
   wherein an upstream end of the inner pipe is fixed to an inner circumferential.

* * * * *